(12) United States Patent
Kojima

(10) Patent No.: US 7,924,769 B2
(45) Date of Patent: Apr. 12, 2011

(54) COMMUNICATION APPARATUS, COMMUNICATION CONTROL UNIT, COMMUNICATION METHOD AND COMPUTER-READABLE STORAGE MEDIUM

(75) Inventor: Masakazu Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 935 days.

(21) Appl. No.: 10/981,483

(22) Filed: Nov. 5, 2004

(65) Prior Publication Data

US 2006/0034211 A1 Feb. 16, 2006

(30) Foreign Application Priority Data

Aug. 10, 2004 (JP) ................................. 2004-233484

(51) Int. Cl.
*H04Q 7/00* (2006.01)
(52) U.S. Cl. ........ 370/328; 370/338; 370/349; 370/352; 370/342; 455/415; 455/417; 455/456.1; 455/433
(58) Field of Classification Search .................. 370/328, 370/349, 338, 352, 342; 455/456.1, 436, 455/417, 432–435.1, 426, 445, 465; 704/226
See application file for complete search history.

(56) References Cited

U.S. PATENT DOCUMENTS

| | | | | | |
|---|---|---|---|---|---|
| 6,081,715 | A | * | 6/2000 | La Porta et al. | ............... 455/445 |
| 6,473,411 | B1 | * | 10/2002 | Kumaki et al. | ............... 370/331 |
| 6,553,227 | B1 | * | 4/2003 | Ho et al. | ...................... 455/433 |
| 6,614,774 | B1 | * | 9/2003 | Wang | .............................. 370/338 |
| 7,082,118 | B1 | * | 7/2006 | Sethi | ............................... 370/349 |
| 7,177,636 | B2 | * | 2/2007 | Oda et al. | ................... 455/426.1 |
| 7,286,520 | B2 | * | 10/2007 | Takeda et al. | ................. 370/349 |
| 7,356,009 | B1 | * | 4/2008 | Meier et al. | .................... 370/338 |
| 2004/0203894 | A1 | * | 10/2004 | Watanabe et al. | .......... 455/456.1 |
| 2004/0242214 | A1 | * | 12/2004 | Shibata | ......................... 455/417 |
| 2004/0248595 | A1 | * | 12/2004 | Hicks et al. | ...................... 455/465 |
| 2005/0188110 | A1 | * | 8/2005 | Hollatz | ......................... 709/244 |

FOREIGN PATENT DOCUMENTS

| | | |
|---|---|---|
| JP | 07-322334 | 12/1995 |
| JP | 11-289383 | 10/1999 |
| JP | 2003-250003 | 9/2003 |
| JP | 2004-200839 | 7/2004 |

OTHER PUBLICATIONS

Japanese Office Action issued May 25, 2010 in corresponding Japanese Patent Application 2004-233484.

* cited by examiner

*Primary Examiner* — Nick Corsaro
*Assistant Examiner* — Michael T Vu
(74) *Attorney, Agent, or Firm* — Staas & Halsey LLP

(57) ABSTRACT

A communication apparatus makes a wireless communication with a communication control unit that is coupled to a network. The communication apparatus includes a part to make a call with respect to another communication apparatus on a called end, a part to receive an address of the other communication apparatus on the called end from a first communication control unit that is located at a location of the other communication apparatus on the called end, a part to make a call to the address, and a part to make a busy registration with respect to a server that is coupled to the network so as to register a telephone number of the communication apparatus.

17 Claims, 10 Drawing Sheets

COMMUNICATION APPARATUS, COMMUNICATION CONTROL UNIT, COMMUNICATION METHOD AND COMPUTER-READABLE STORAGE MEDIUM

This application claims the benefit of a Japanese Patent Application No. 2004-233484 filed Aug. 10, 2004, in the Japanese Patent Office, the disclosure of which is hereby incorporated by reference.

BACKGROUND OF THE INVENTION

1. Field of the Invention

The present invention generally relates to communication apparatuses, communication control units, communication methods and computer-readable storage media, and more particularly to a communication apparatus, a communication control unit and a communication method which are suited for making short-range (or near) wireless communications using wireless local area network (LAN), blue tooth and the like, typified by a hot spot, and to a computer-readable storage medium which stores a program for causing a computer to make such short-range wireless communications.

2. Description of the Related Art

FIGS. 1 and 2 are diagrams for explaining an example of a conventional Internet protocol (IP phone system (SIP). FIG. 1 shows a general structure of the conventional IP phone system, and FIG. 2 shows a time chart for explaining an operation of the conventional IP phone system.

In FIG. 1, each of mobile terminals 101 through 103 are connectable to a server 100 via corresponding wireless routers 111 through 113 and a network 110 such as the Internet. The server 100 includes a proxy server Z that makes a calling destination location inquiry and the like, and a location server Y that registers and manages location information (position information) such as Internet addresses and telephone numbers of each of the mobile terminals 101 through 103. It is assumed for the sake of convenience that the Internet address, the IP address and the telephone number of the mobile terminal 101 respectively are "A@a.aaa.com", "10.1.1.10" and "050-111-1111", the Internet address, the IP address and the telephone number of the mobile terminal 102 respectively are "B@b.aaa.com", "10.1.2.20" and "050-222-2222", and the Internet address, the IP address and the telephone number of the mobile terminal 103 respectively are "C@c.aaa.com", "10.1.3.30" and "050-333-3333". In addition, it is assumed that Internet address and the IP address of the wireless router 111 respectively are "a.aaa.com" and "10.1.1.1", the Internet address and the IP address of the wireless router 112 respectively are "b.aaa.com" and "10.1.2.1", and the Internet address and the IP address of the wireless router 113 respectively are "c.aaa.com" and "10.1.3.1". Furthermore, it is assumed that the Internet address of the server 110 is "aaa.com", the IP address of the proxy server Z is "10.1.0.1", and the IP address of the location server Y is "10.1.0.2". It is also assumed that, when the mobile terminal 102 moves from its home location to an external location, the Internet address and the IP address of the mobile terminal 102 respectively change to "B@c.aaa.com" and "10.1.3.40".

FIG. 2 shows a procedure P1 from a time when the mobile terminal 101 calls the mobile terminal 102 up to a time when a communication is made therebetween, and a procedure P2 for a case where location information is to be registered when the mobile terminal 102 moves from its home location to an external location.

In the procedure P1, the mobile terminal 101 makes a call, with respect to the mobile terminal 102 having the telephone number "050-222-2222", to the proxy server Z. The proxy server Z makes a location inquiry related to the mobile terminal 102, to the location server Y. The location server Y returns a response with respect to the location inquiry, to the proxy server Z. The proxy server Z makes a call to the mobile terminal 102 based on the response (location information) from the location server Y. When an off-hook occurs at the mobile terminal 102 in response to a ringing, a response is returned to the proxy server Z, and the proxy server Z returns this response to the mobile terminal 101. The mobile terminal 101 returns to the proxy server Z a response with respect to the response received from the proxy server Z, and the proxy server Z returns the response received from the mobile terminal 101 to the mobile terminal 102. Accordingly, a communication becomes possible between the mobile terminal 101 and the mobile terminal 102, as indicated by a bold line in FIG. 1.

In the procedure P2, if the mobile terminal 102 moves from its home location (B@b.aaa.com, 10.1.2.20) to an external location having the Internet address "B@c.aaa.com" and the IP address "10.1.3.40", the mobile terminal 102 can no longer maintain the connection with the mobile terminal 101 because the IP address of the mobile terminal 102 changes, and the connection is disconnected as indicated by a broken line in FIG. 2. The mobile terminal 102 which has moved in this manner makes a location registration of the external location with respect to the location server Y. When the moved mobile terminal 102 makes a call to the proxy server Z, the proxy server Z makes a location inquiry related to the mobile terminal 101 with respect to the location server Y. The location server Y returns to the proxy server Z a response with respect to the location inquiry received from the proxy server Z, and the proxy server Z makes a call to the mobile terminal 101 based on the response (location information) received from the location server Y. When an off-hook occurs at the mobile terminal 101 in response to a ringing, a response is returned to the proxy server Z, and the proxy server Z returns this response to the moved mobile terminal 102. Accordingly, a communication becomes possible between the moved mobile terminal 102 and the mobile terminal 101, as indicated by a broken line in FIG. 1.

FIGS. 3 through 5 are diagrams for explaining a conceivable mobile IP phone system, that is conceivable when the SIP system is applied to the conventional mobile IP phone system. FIG. 3 is a diagram showing a general structure of this conceivable mobile IP phone system, and FIGS. 4 and 5 are time charts for explaining an operation of this conceivable mobile IP phone system. In FIG. 3, those parts which are essentially the same as those corresponding parts in FIG. 1 are designated by the same reference numerals, and a description thereof will be omitted.

In the case of the conceivable mobile IP phone system shown in FIG. 3, home agents (HAs) 121 through 123 are provided in correspondence with the wireless routers 111 through 113 at the home locations of the mobile terminals 101 through 103. The HAs 121 through 123 register and manage location information related to the corresponding mobile terminals 101 through 103 at the respective home locations. Hence, even if the mobile terminal 102 moves from its home location, for example, the HA 122 at this home location manages the location information related to a present location of the mobile terminal 102, so that a communication with the moved mobile terminal 102 can be made via the HA 122.

FIG. 4 shows a procedure P11 from a time when the mobile terminal 101 calls the mobile terminal 102 up to a time when a communication is made therebetween, and a procedure P12 for a case where location information is to be registered when the mobile terminal 102 moves from its home location to an external location.

In the procedure P11, the mobile terminal 101 makes a call, with respect to the mobile terminal 102 having the telephone number "050-222-2222", to the proxy server Z. The proxy server Z makes a location inquiry related to the mobile terminal 102, to the location server Y. The location server Y returns a response with respect to the location inquiry, to the proxy server Z. The proxy server Z makes a call to the mobile terminal 102 based on the response (location information) from the location server Y. When an off-hook occurs at the mobile terminal 102 in response to a ringing, a response is returned to the proxy server Z, and the proxy server Z returns this response to the mobile terminal 101. The mobile terminal 101 returns to the mobile terminal 102 a response with respect to the response received from the proxy server Z. Accordingly, a communication becomes possible between the mobile terminal 101 and the mobile terminal 102, as indicated by a bold line in FIG. 4.

In the procedure P12, if the mobile terminal 102 moves from its home location (B@b.aaa.com, 10.1.2.20) to an external location having the Internet address "B@c.aaa.com" and the IP address "10.1.3.40", the moved mobile terminal 102 receives an advertising that is periodically made by the HA 123. In this case, a care of (c/o) address "10.1.3.40" of the external location is sent from the HA 123 to the moved mobile terminal 102. The moved mobile terminal 102 makes a location registration of the external location with respect to the HA 122 which is located at the home location of the mobile terminal 102. Accordingly, a communication becomes possible between the moved mobile terminal 102 and the mobile terminal 101 via the HAs 122 and 123, as indicated by a broken line in FIG. 3. In other words, the communication between the moved mobile terminal 102 and the mobile terminal 101 is made via the HA 122 that is located at the home location of the mobile terminal 102 and the HA 123 that is located at the external location where the moved mobile terminal 102 is presently located.

FIG. 5 shows a procedure from a time when the mobile terminal 101 calls the mobile terminal 102 up to a time when a communication is made therebetween, for a case where both the mobile terminals 101 and 102 have moved from their home locations before the call is made.

In the procedure shown in FIG. 5, the mobile terminal 102 located at an external location having a c/o address "10.1.1.40" make a call to the proxy server Z, and the proxy server Z makes a location inquiry related to the mobile terminal 101, to the location server Y. The location server Y returns a response with respect to the location inquiry to the proxy server Z, and the proxy server Z makes a call to the HA 121 that is located at the external location having the c/o address "10.1.1.40" based on the response (location information) received from the location server Y. For the sake of convenience, it is assumed that the mobile terminal 101 is located at an external location having a c/o address "10.1.2.40". Hence, the HA 121 makes a call to the HA 122 that is located at the external location having the c/o address "100.1.2.40", and the HA 122 makes a call to the mobile terminal 101. When an off-hook occurs at the mobile terminal 101 in response to a ringing, a response is returned to the proxy server Z, and the proxy server Z returns this response to the HA 122. The HA 122 returns to the HA 121 a response with respect to the response received from the proxy server Z, and the HA 121 returns the received response to the mobile terminal 102. Accordingly, a communication becomes possible between the moved mobile terminal 101 and the moved mobile terminal 102, as indicated by a bold line in FIG. 5.

However, according to the conventional IP phone system described above in conjunction with FIGS. 1 and 2, the IP address of the mobile terminal changes when this mobile terminal moves from its home location to an external location. For this reason, the connection of this mobile terminal with another mobile terminal to which a communication is being made cannot be maintained. Furthermore, since frequent moving of the mobile terminal was not assumed for the conventional IP phone system, there was a problem in that a location registration must be made to the location server every time the mobile terminal moves from its home location to an external location.

On the other hand, according to the conceivable mobile IP phone system described above in conjunction with FIGS. 3 through 5, when the mobile terminal moves from its home location to an external location, a communication with another mobile terminal is made via an HA located at the home location of the mobile terminal, an HA located at the external location where the mobile terminal is presently located, and an HA located at the home location of the other mobile terminal where the other mobile terminal is located. As a result, the need to communicate via a plurality of HAs causes congestion of the communication (communication congestion), and there was a problem in that a delay generated in the communication (communication delay) via the HAs is not negligible.

SUMMARY OF THE INVENTION

Accordingly, it is a general object of the present invention to provide a novel and useful communication apparatus, communication control unit, communication method and computer-readable storage medium, in which the problems described above are suppressed.

Another and more specific object of the present invention is to provide a communication apparatus, a communication control unit, a communication method and a computer-readable storage medium, which do not require a mobile terminal to make a location registration to a location server when the mobile terminal moves from its home location to an external location, and can suppress generation of communication congestion and communication delay.

Still another object of the present invention is to provide a communication apparatus for making a wireless communication with a communication control unit that is coupled to a network, comprising a part configured to make a call with respect to another communication apparatus on a called end; a part configured to receive an address of the other communication apparatus on the called end from a first communication control unit that is located at a location of the other communication apparatus on the called end; a part configured to make a call to the address; and a part configured to make a busy registration with respect to a server that is coupled to the network so as to register a telephone number of the communication apparatus. According to the communication apparatus of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

A further object of the present invention is to provide a communication apparatus for making a wireless communication with a communication control unit that is coupled to a network, comprising a part configured to make a location registration cancellation with respect to a first communication control unit that is provided at a home location of the communication apparatus and to make a location registration with respect to a second communication control unit that is provided at an external location, when the communication apparatus moves from its home location to the external location during communication with another communication apparatus; and a part configured to notify an address assigned from the second communication control unit to the other communication apparatus. According to the communication apparatus of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

Another object of the present invention is to provide a communication control unit coupled via a network to a second communication control unit that is capable of making a wireless communication with a communication apparatus, comprising a part, responsive to a call from a calling end to a called end, configured to inquire an address of a communication apparatus at the called end with respect to the second communication control unit; and a part configured to notify the address of the communication apparatus on the called end, received from the second communication control unit, to a communication apparatus on the calling end. According to the communication control unit of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

Still another object of the present invention is to provide a communication control unit provided at a location and capable of making a wireless communication with a communication apparatus, comprising a database configured to register and manage location information related to a communication apparatus located at the location; and a part, responsive to a location inquiry related to a communication apparatus on a called end, configured to notify location information related to the communication apparatus on the called end if the location information related to the communication apparatus on the called end is registered in the database. According to the communication control unit of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

A further object of the present invention is to provide a communication method for making a wireless communication between a communication apparatus and a first communication control unit that is coupled to a second communication control unit via a network, comprising managing location information of a communication apparatus that is located at each location in the first communication control unit provided at each location; inquiring from the second communication control unit with respect to the first communication control unit an address of a communication apparatus on a called end in response to a call to the called end; and notifying from the second communication control unit to a communication apparatus on a calling end the address of the communication apparatus on the called end notified from the first communication control unit. According to the communication method of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

Another object of the present invention is to provide a computer-readable storage medium which stores a program for causing a computer to function as a first communication apparatus that makes a wireless communication with a communication control unit coupled to a network, the program comprising a procedure causing the computer to make a call with respect to a second communication apparatus on a called end; a procedure causing the computer to receive an address of the second communication apparatus from a communication control unit that is provided at a location where the second communication apparatus is located; a procedure causing the computer to call the address; and a procedure causing the computer to make a busy registration of a telephone number of the first communication apparatus with respect to a server that is coupled to the network. According to the computer-readable storage medium of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

Still another object of the present invention is to provide a computer-readable storage medium which stores a program for causing a computer to function as a first communication apparatus that makes a wireless communication with a communication control unit coupled to a network, the program comprising a procedure causing the computer to make a location registration cancellation with respect to a first communication control unit that is provided at a home location of the first communication apparatus and to make a location registration with respect to a second communication control unit that is provided at an external location, when the first communication apparatus moves from its home location to the external location during communication with a second communication apparatus; and a procedure causing the computer to notify an address assigned from the second communication control unit to the second communication apparatus. According to the computer-readable storage medium of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

A further object of the present invention is to provide a computer-readable storage medium which stores a program for causing a computer to function as a first communication control unit coupled via a network to a second communication control unit that is capable of making a wireless communication with a communication apparatus, the program comprising a procedure causing the computer to inquire an address of a communication apparatus on a called end with respect to the second communication control unit in response to a call from a calling end to the called end; and a procedure causing the computer to notify the address of the communication apparatus on the called end notified from the second communication control unit to a communication apparatus on the calling end. According to the computer-readable storage medium of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

Another object of the present invention is to provide a computer-readable storage medium which stores a program for causing a computer to function as a communication control unit that is provided at a location and is capable of making a wireless communication with a communication apparatus, the program comprising a procedure causing the computer to register and manage location information related to a communication apparatus that is located at the location in a database; and a procedure causing the computer to notify location information of a communication apparatus on a calling end to a source of a location inquiry that is related to the communication apparatus on the calling end in response to the location inquiry if the location information of the communication apparatus on the calling end is registered in the database. According to the computer-readable storage medium of the present invention, it is unnecessary for a mobile terminal to make a location registration to a location server when the mobile terminal moves from its home location to an external location, and it is possible to suppress generation of communication congestion and communication delay, so that the delay does not cause problems particularly in the case of audio (or voice) communication.

Other objects and further features of the present invention will be apparent from the following detailed description when read in conjunction with the accompanying drawings.

DESCRIPTION OF THE PREFERRED EMBODIMENTS

A description will be given of embodiments of a communication apparatus, a communication control unit, a communication method and a computer-readable storage medium according to the present invention, by referring to FIG. 6 and the subsequent drawings.

Figure 1:
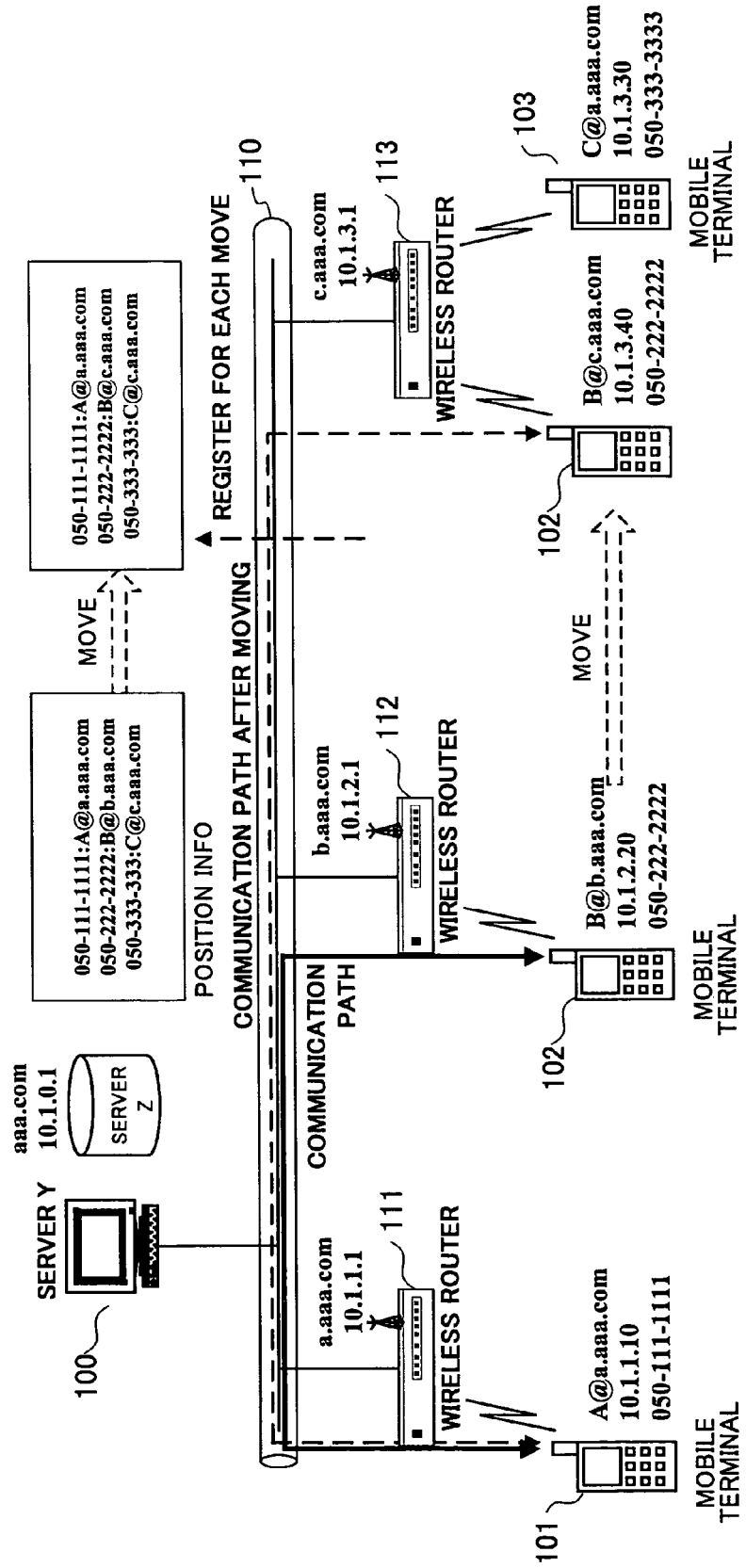
FIG. 1 is a diagram showing a general structure of a conventional IP phone system.
Figure 2:
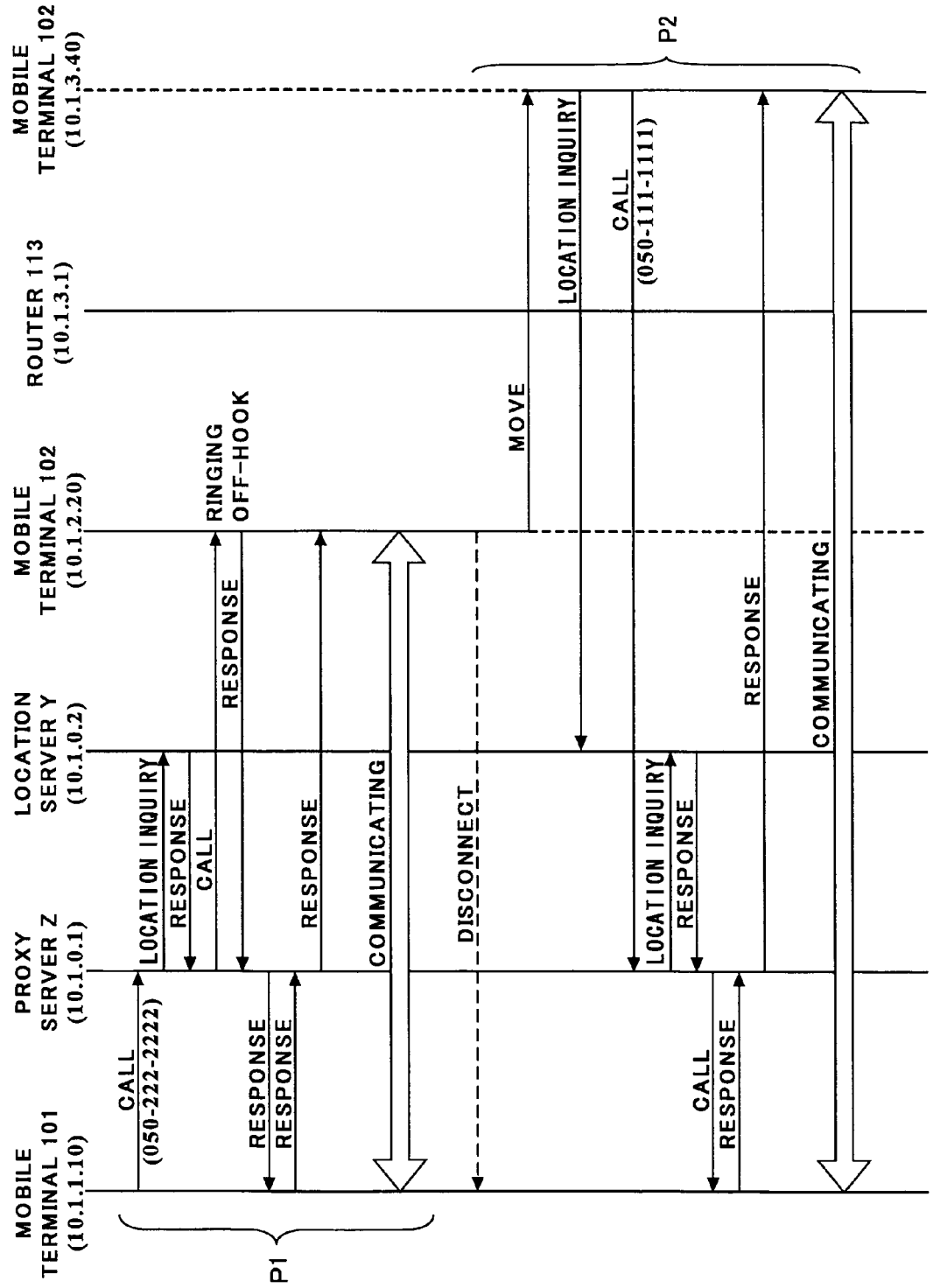
FIG. 2 is a time chart for explaining an operation of the conventional IP phone system.
Figure 3:
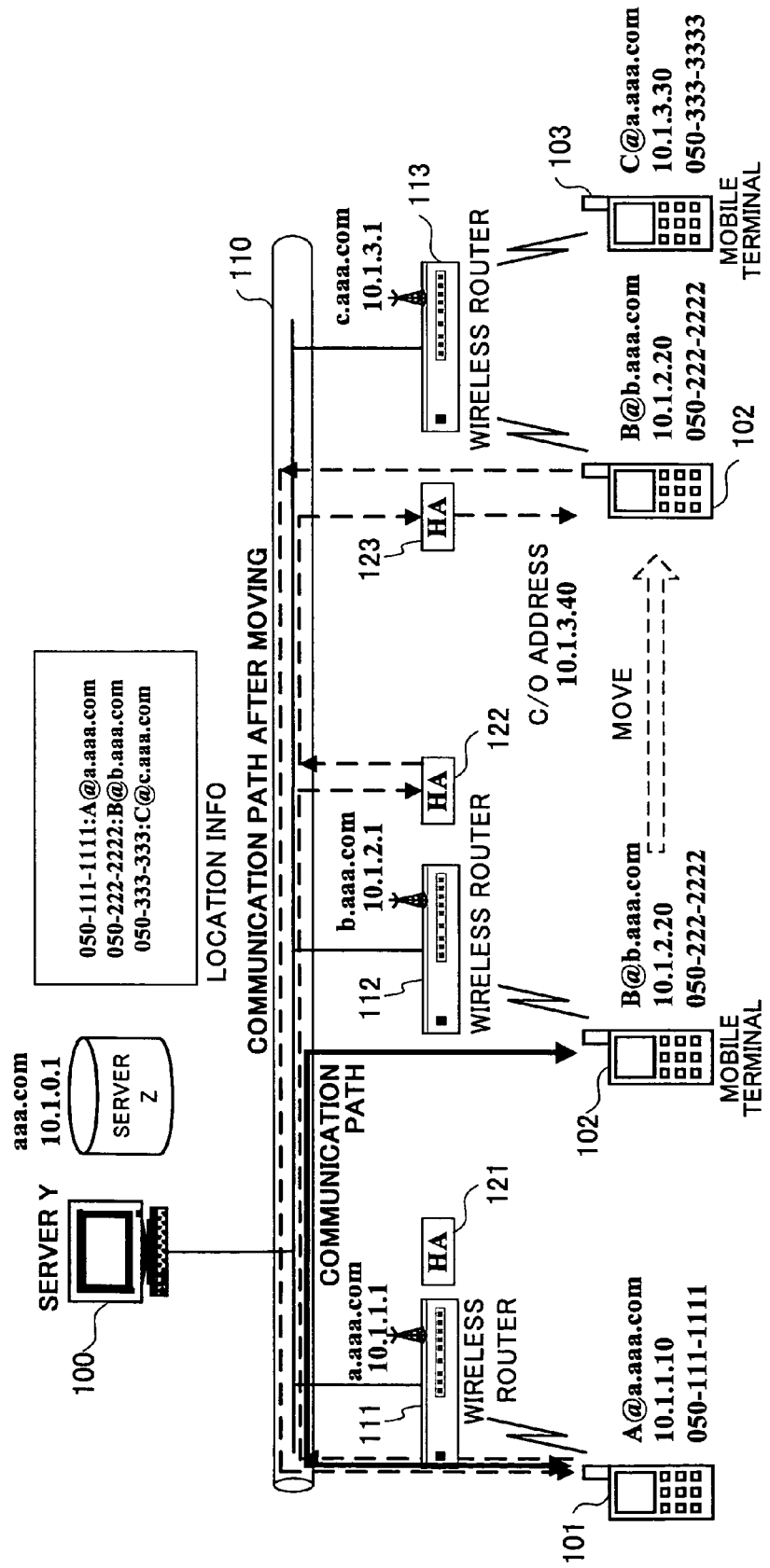
FIG. 3 is a diagram showing a general structure of a conceivable mobile IP phone system.
Figure 4:
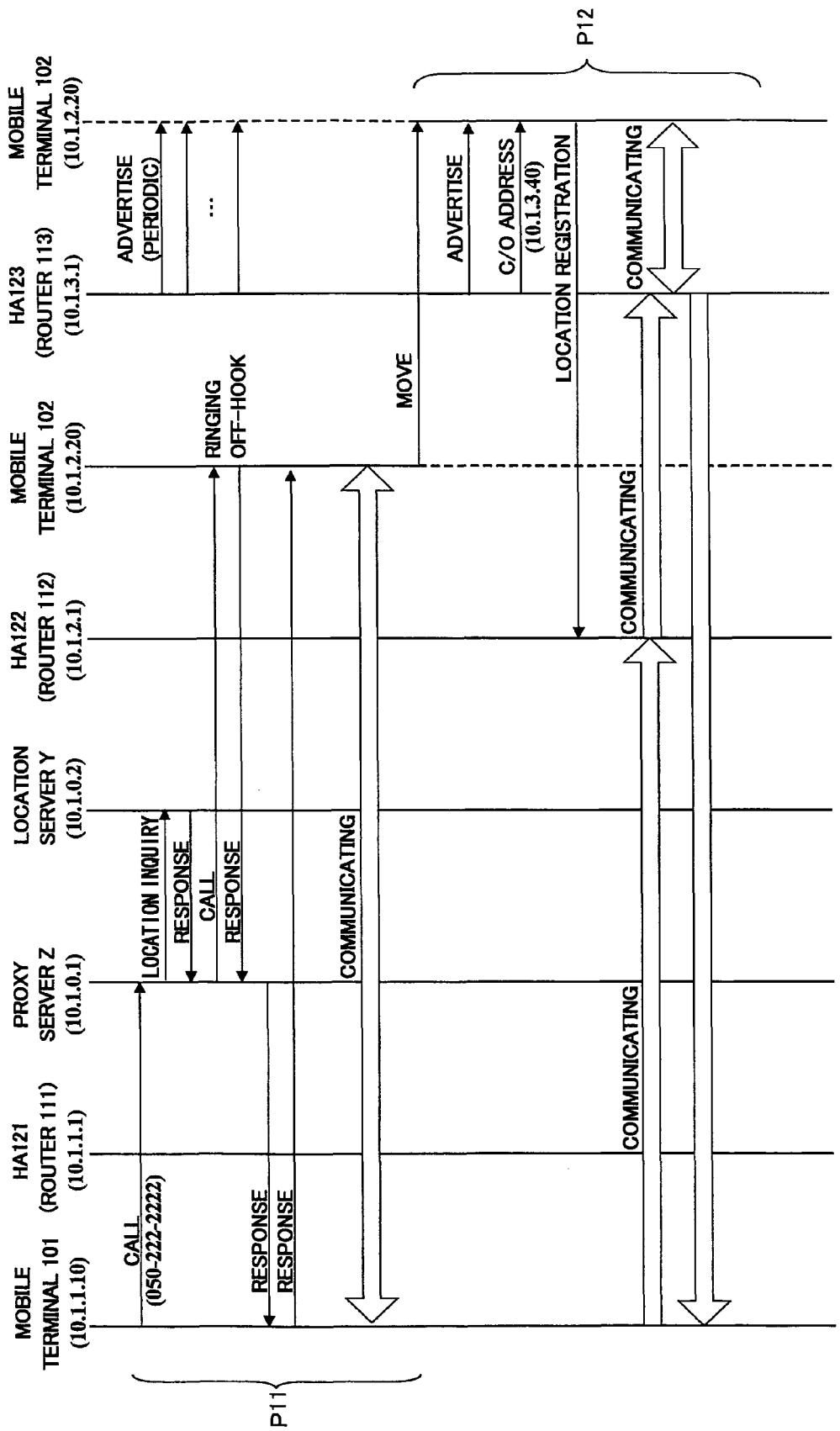
FIG. 4 is a time chart for explaining an operation of the conceivable mobile IP phone system.
Figure 5:
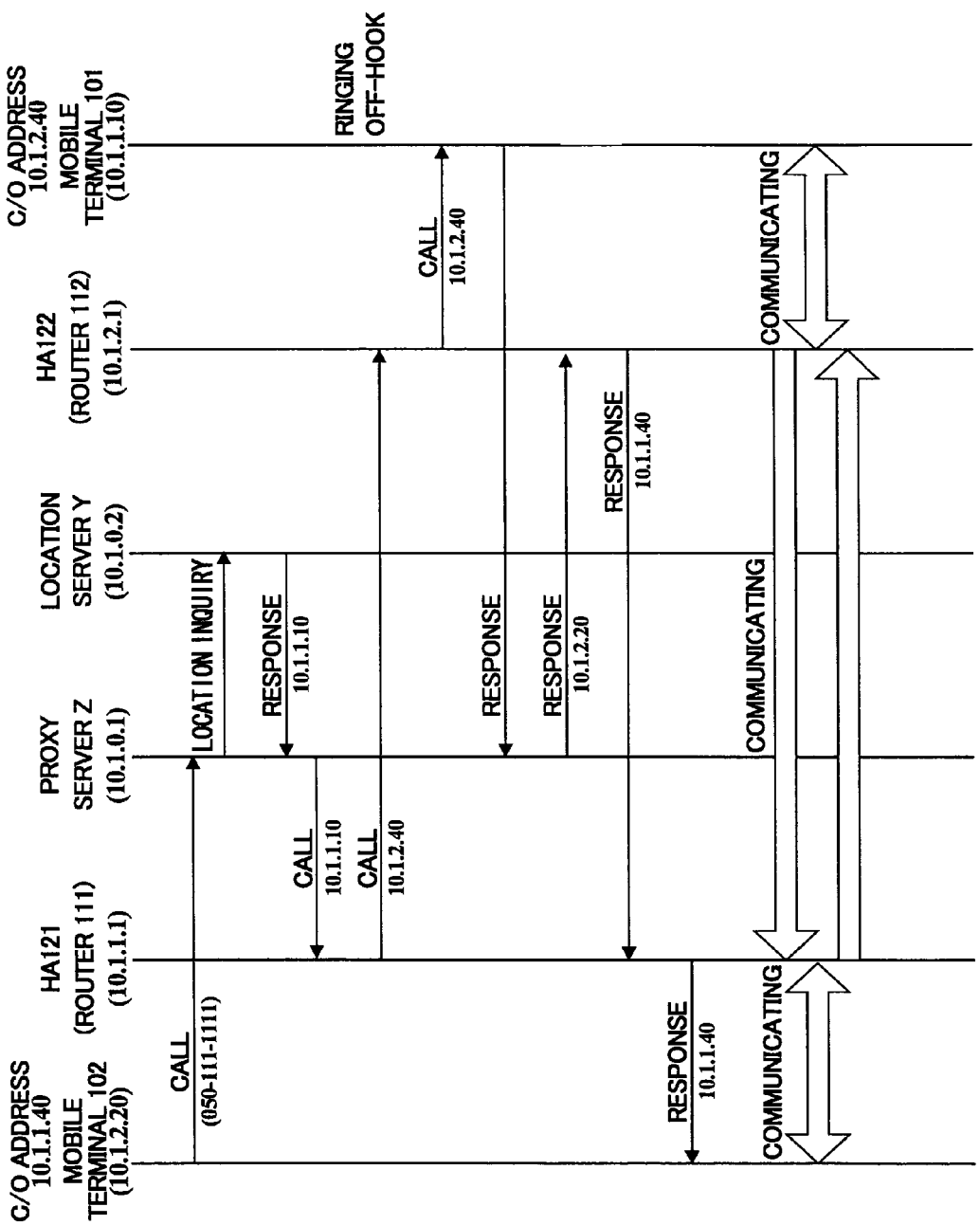
FIG. 5 is a time chart for explaining the operation of the conceivable mobile IP phone system.
Figure 6:
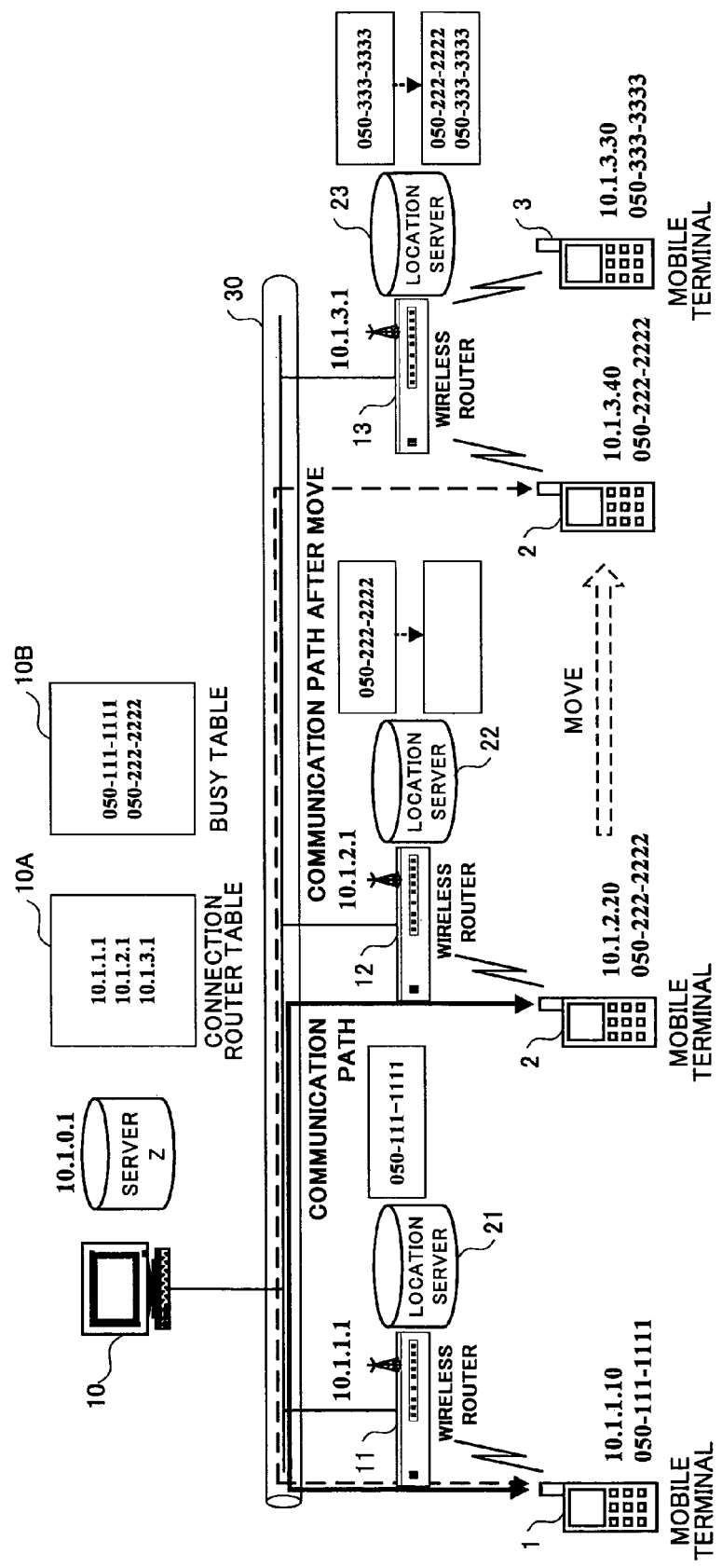
FIG. 6 is a diagram showing a general structure of a mobile IP phone system applied with a first embodiment of the present invention.
Figure 7:
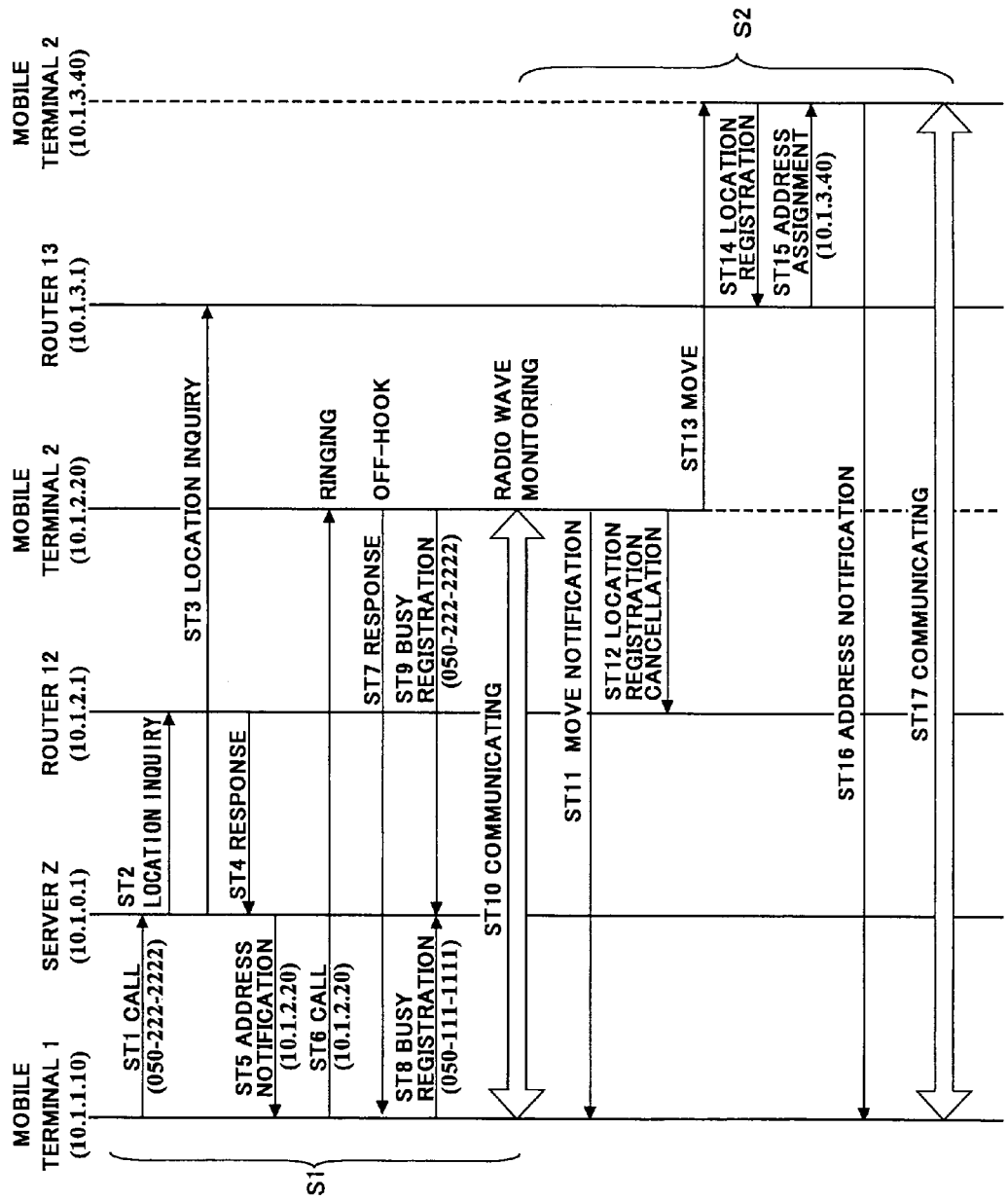
FIG. 7 is a time chart for explaining an operation of the mobile IP phone system applied with the first embodiment of the present invention.

FIGS. 6 and 7 are diagrams for explaining a mobile IP phone system that is applied with a first embodiment of the present invention. FIG. 6 is a diagram showing a general structure of the mobile IP phone system applied with the first embodiment of the present invention, and FIG. 7 is a time chart for explaining an operation of the mobile IP phone system applied with the first embodiment of the present invention.

In FIG. 6, each of mobile terminals 1 through 3 are connectable to a server 10 via corresponding wireless routers 11 through 13 and a network 30 such as the Internet. Location servers 21 through 23 are provided with respect to the corresponding wireless routers 11 through 13. Each wireless router and the corresponding location server may be formed by separate apparatuses or, the corresponding wireless router and location server may be formed as a single apparatus.

The server 10 includes a connection router table 10A and a busy table 10B. The connection router table 10A registers and manages location information, including IP addresses, of the wireless routers 11 through 13 that are located at the home locations of the respective mobile terminals 1 through 3. The busy table 10B registers and manages location information, including telephone numbers, of the mobile terminals 1 through 3 that are subject to a busy registration. The server 10 may be formed by a known computer system that includes a processor, a memory and the like, and the connection router table 10A and the busy table 10B may be stored in the memory of the computer system. Each of the mobile terminals 1 through 3 has a known structure that includes a processor, a memory and the like and capable of making a wireless communication with the wireless routers 11 through 13. Each of the location servers 21 through 23 has a known structure that includes a processor, a memory and the like and capable of making a wireless communication with the mobile terminals 1 through 3. Each of the location servers 21 through 23 has a database for registering and managing location information of each mobile terminal that is located within the location where each of the location servers 21 through 23 (and the corresponding wireless routers 11 through 13) is provided. Each of the location servers 21 through 23 may be formed by a known computer system that includes a processor, a memory and the like, and the database may be stored in the memory of the computer system.

It is assumed for the sake of convenience that the IP address and the telephone number of the mobile terminal 1 located at its home location respectively are "10.1.1.10" and "050-111-1111", the IP address and the telephone number of the mobile terminal 2 located at its home location respectively are "10.1.2.20" and "050-222-2222", and the IP address and the telephone number of the mobile terminal 3 located at its home location respectively are "10.1.3.30" and "050-333-3333". It is assumed that the IP address of the wireless router 11 is "10.1.1.1", the IP address of the wireless router 12 is "10.1.2.1", and the IP address of the wireless router 13 is "10.1.3.1". It is assumed that the Internet address of the server 10 is "aaa.com", and the IP address of the server 10 is "10.1.0.1". Furthermore, it is assumed that the IP address of the mobile terminal 2 changes to "10.1.3.40" when the mobile terminal 2 moves from its home location to an external location.

Each of the mobile terminals 1 through 3 forms a communication apparatus of this embodiment. Each of the wireless routers 11 through 13 and/or location servers 21 through 23 and the server 10 (proxy server Z) forms a communication control unit of this embodiment. In addition, the procedure shown in FIG. 7 corresponds to the communication method of this embodiment. Moreover, each program that is executed by a processor (for example, a CPU) of each of the mobile terminals 1 through 3, each of the wireless routers 11 through 13 and/or each of the location servers 21 through 23 and the server 10 (proxy server Z) is stored in the computer-readable storage medium of this embodiment, such as the memory.

FIG. 7 shows a procedure S1 from a time when the mobile terminal 1 calls the mobile terminal 2 up to a time when a communication is made therebetween, and a procedure S2 for a case where location information is to be registered when the mobile terminal 2 moves from its home location to an external location.

In the procedure S1, the mobile terminal 1 makes a call with respect to the mobile terminal 2 having the telephone number "050-222-2222", to the proxy server Z, in a step ST1. The proxy server Z makes a location inquiry related to the mobile terminal 2, to the wireless router 12, based on the connection router table 10A, in a step ST2. The proxy server Z makes a location inquiry related to the mobile terminal 2, to other wireless router (in this case, the wireless router 13), based on the connection router table 10A, in a step ST3. In this case, since the mobile terminal 2 is located at its home location, the wireless router 12 that is provided at the home location of the mobile terminal 2 returns a response with respect to the location inquiry to the proxy server Z based on the location information related to the mobile terminal 2 managed within the database of the location server 22, in a step ST4. The proxy server Z makes an address notification related to the IP address "10.1.2.20" of the mobile terminal 2 to the mobile terminal 1 based on the response (location information) received from the wireless router 12, in a step ST5. The mobile terminal 1 makes a call to the IP address "10.1.2.20" of the mobile terminal 2, based on the address notification, in a step ST6. When an off-hook occurs at the mobile terminal 2 in response to a ringing, a response is returned to the mobile terminal 1, in a step ST7. The mobile terminal 1 makes a busy registration in a step ST8, to register the telephone number "050-111-1111" of the mobile terminal 1 to the busy table 10B of the proxy server Z. The mobile terminal 2 makes a busy registration in a step ST9, to register the telephone number "050-222-222" of the mobile terminal 2 to the busy table 10B of the proxy server Z. Accordingly, a communication becomes possible between the mobile terminals 1 and 2 in a step ST10, as indicated by a bold line in FIG. 6.

In the procedure S2, it is assumed that the mobile terminal 2 moves from its home location having the IP address "10.1.2.20" to an external location having the IP address "10.1.3.40". In this case, the mobile terminal 2 makes a move notification with respect to the mobile terminal 1 in a step ST11. In addition, the mobile terminal 2 makes a location registration cancellation with respect to the wireless router 12 at its home location in a step ST12, so as to delete the location information related to the mobile terminal 2 from the database of the corresponding location server 22. For example, the step ST12 may make the location registration cancellation by judging that the mobile terminal 2 has moved from its home position when a radio wave intensity received by the mobile terminal 2 from the wireless router 12 at its home location becomes less than or equal to a predetermined value. When the mobile terminal 2 moves to the external location having the IP address "10.1.3.40" in a step ST13, the mobile terminal 2 makes a location registration with respect to the wireless router 13 that is provided at this external location in a step ST14, so as to make a location registration to the database of the corresponding location server 23. For example, the step ST14 judges that the mobile terminal 2 has moved from its home location to the external location where the wireless router 13 is provided, when the radio wave intensity received by the mobile terminal 2 from the wireless router 13 at the external location becomes greater than a predetermined value and is also greater than the radio wave intensity received from the wireless router 12 provided at its home position. Hence, the location information related to the mobile terminal 2 is registered in the location server 23. The wireless router 13 assigns the IP address "10.1.3.40" of this external location to the mobile terminal 2 in a step ST15, and the mobile terminal 2 makes an address notification related to the present IP address "10.1.3.40" of the mobile terminal 2 in a step ST16. Accordingly, a communication between the moved mobile terminal 2 and the mobile terminal 1 becomes possible via the wireless router 13 that is provided at the external location where the moved mobile terminal 2 is presently located, becomes possible in a step ST17 as indicated by a broken line in FIG. 6. In other words, the communication between the moved mobile terminal 2 and the mobile terminal 1 is made without going through the wireless router 12 that is provided at the original home location of the mobile terminal 2. Hence, the communication between the moved mobile terminal 2 and the mobile terminal 1 is made via only the wireless router 13 that is provided at the external location where the moved mobile terminal 2 is presently located and the wireless router 11 that is provided at the location (in this case, the original home location) where the mobile terminal 1 is presently located, and the communication does not go through the wireless router 12 that is provided at the original home location of the mobile terminal 2 before the mobile terminal 2 moved.

Therefore, in this embodiment, the wireless router is provided with a dynamic host configuration protocol (DHCP) function for assigning the IP address to the mobile terminal, and a database (of the location server) for managing the mobile terminals. When a call is generated from a mobile terminal on a calling (or source) end to a mobile terminal on a called (or receiving) end, a location inquiry related to the mobile terminal at the called end is made to the wireless router. Using the database (of the location server) that manages the location information of the mobile terminal at the called end, the IP address of the mobile terminal at the called end is returned from the wireless router to the mobile terminal at the calling end, to thereby realize a peer-to-peer communication. For this reason, the changing of the IP address which occurs when the mobile terminal such as an IP phone frequently moves, can be carried out while maintaining the communication, and it is possible to prevent a load on the network from becoming large when making the peer-to-peer communication. As a result, it is possible to build a large-scale mobile IP phone system which utilizes the hot spot, and it is possible to reduce the communication cost.

Figure 8:
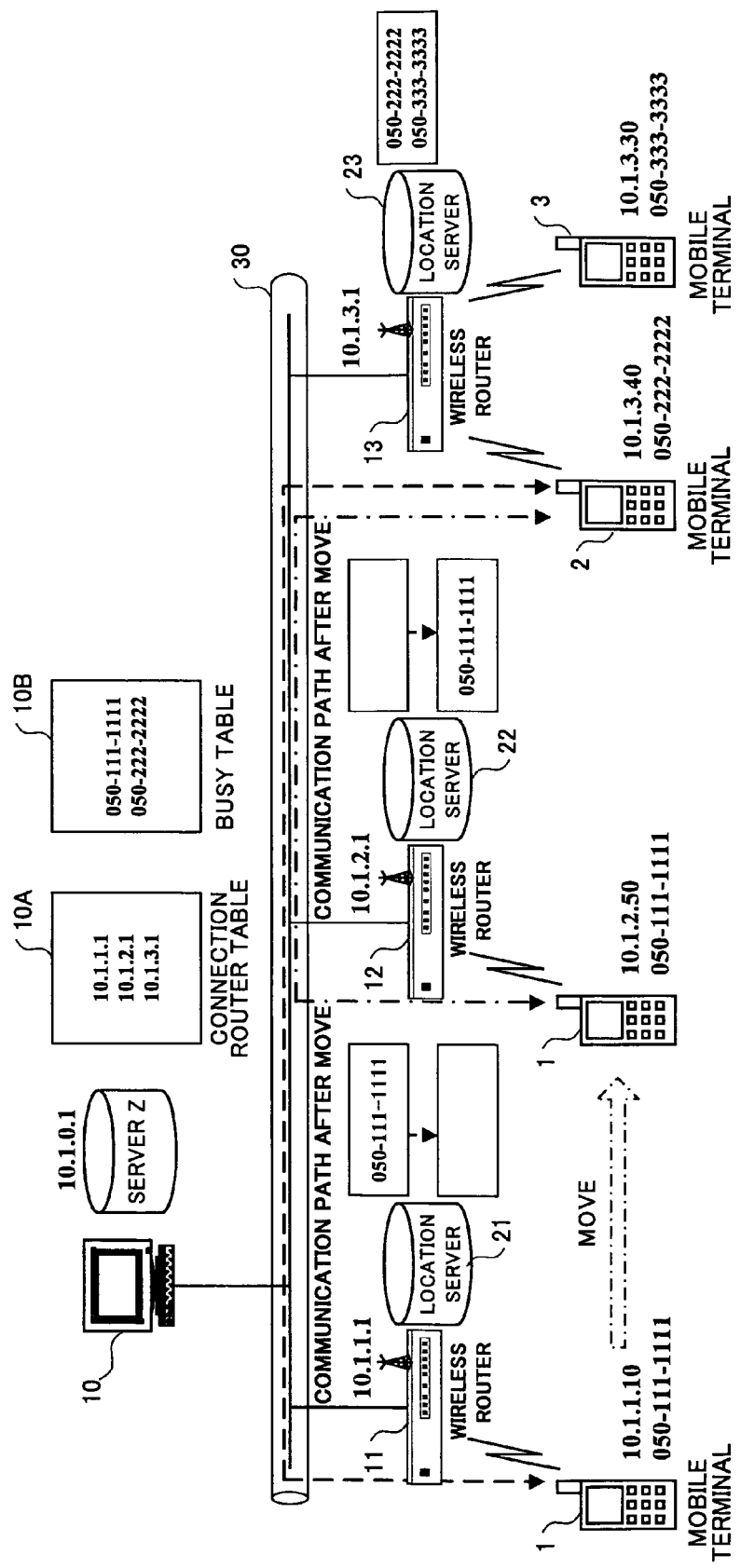
FIG. 8 is a diagram showing a general structure of a mobile IP phone system applied with a second embodiment of the present invention.
Figure 9:
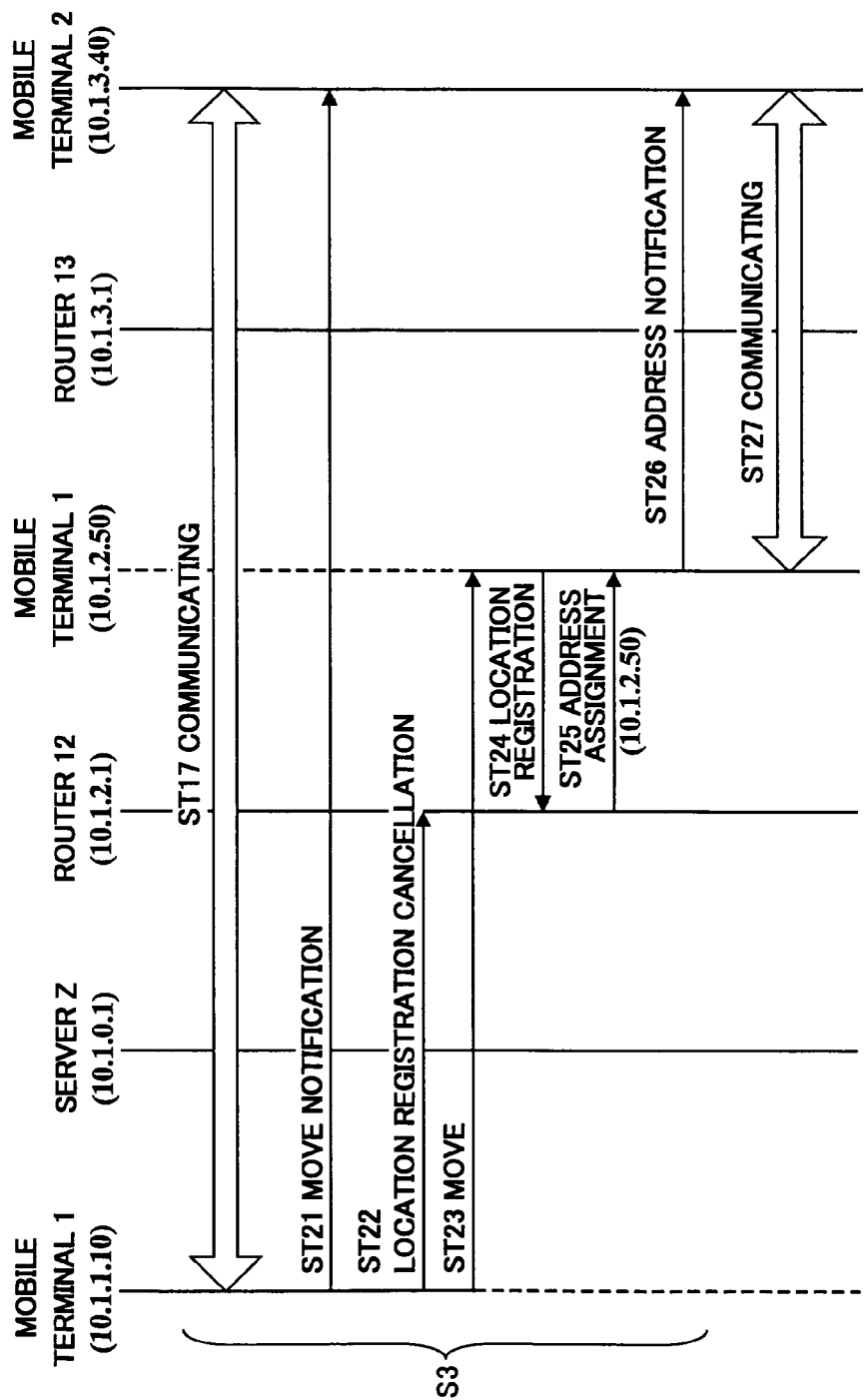
FIG. 9 is a time chart for explaining an operation of the mobile IP phone system applied with the second embodiment of the present invention.

FIGS. 8 and 9 are diagrams for explaining a mobile IP phone system that is applied with a second embodiment of the present invention. FIG. 8 is a diagram showing a general structure of the mobile IP phone system applied with the second embodiment of the present invention, and FIG. 9 is a time chart for explaining an operation of the mobile IP phone system applied with the second embodiment of the present invention. In FIG. 8, those parts which are the same as those corresponding parts in FIG. 6 are designated by the same reference numerals, and a description thereof will be omitted.

In this embodiment, it is assumed for the sake of convenience that the mobile terminal 1 calls the mobile terminal 2 as in the case of the first embodiment, but the mobile terminal 1 also moves while communicating with the mobile terminal 2. FIG. 9 shows a procedure S3 for registering the location information in a case where the mobile terminal 1 moves from its home position to an external communication while the communication is being made between the mobile terminal 1 and the mobile terminal 2 in the step. S17.

In the procedure S3, it is assumed for the sake of convenience that the mobile terminal 1 moves from its home location having the IP address "10.1.1.10" to an external location (that is, the home location of the mobile terminal 2) having the IP address "10.1.2.50". In this case, the mobile terminal 1 makes a move notification with respect to the mobile terminal 2 in a step ST21. In addition, the mobile terminal 1 makes a location registration cancellation with respect to the wireless router 11 that is provided at its home location in a step ST22, so as to delete the location information related to the mobile terminal 1 from the database of the corresponding location server 21. For example, the step ST22 may make the location registration cancellation by judging that the mobile terminal 1 has moved from its home position when a radio wave intensity received by the mobile terminal 1 from the wireless router 11 at its home location becomes less than or equal to a predetermined value. When the mobile terminal 1 moves to the external location having the IP address "10.1.2.50" in a step ST23, the mobile terminal 1 makes a location registration with respect to the wireless router 12 that is provided at this external location in a step ST24, so as to make a location registration to the database of the corresponding location server 22. For example, the step ST24 judges that the mobile terminal 1 has moved from its home location to the external location where the wireless router 12 is provided, when the radio wave intensity received by the mobile terminal 1 from the wireless router 12 at the external location becomes greater than a predetermined value and is also greater than the radio wave intensity received from the wireless router 11 provided at its home position. Hence, the location information related to the mobile terminal 1 is registered in the location server 22. The wireless router 12 assigns the IP address "10.1.2.50" of this external location to the mobile terminal 1 in a step ST25, and the mobile terminal 1 makes an address notification related to the present IP address "10.1.2.50" of the mobile terminal 1 in a step ST26. Accordingly, a communication between the moved mobile terminal 1 and the mobile terminal 2 becomes possible via the wireless router 12 that is provided at the external location where the moved mobile terminal 1 is presently located, becomes possible as indicated by a one-dot chain line in FIG. 8. In other words, the communication between the moved mobile terminal 1 and the mobile terminal 2 is made without going through the wireless router 11 that is provided at the original home location of the mobile terminal 1.

Therefore, according to this embodiment, the communication can be continued even if the mobile terminal on the calling end moves during the communication with the mobile terminal on the receiving end.

Figure 10:
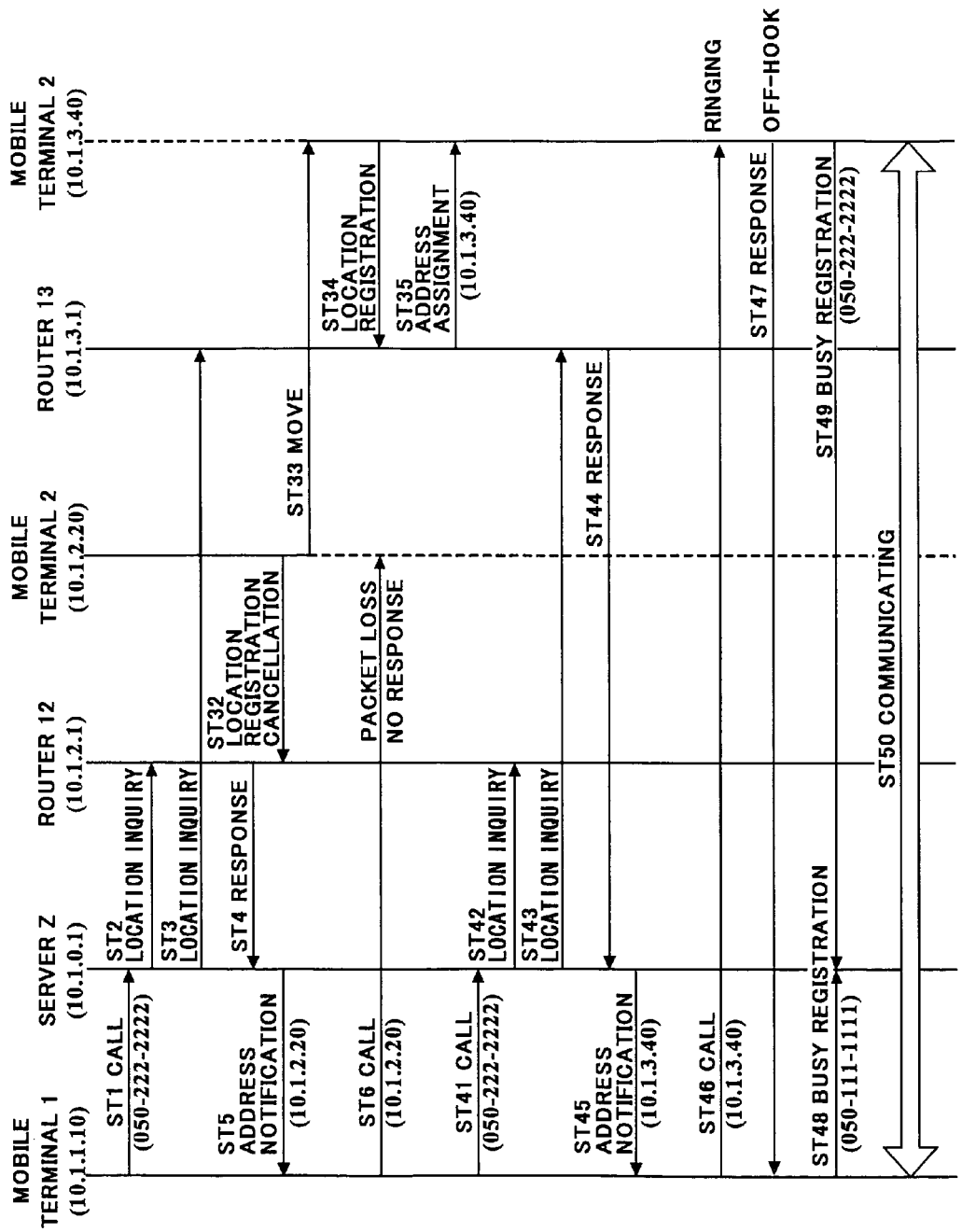
FIG. 10 is a time chart for explaining an operation of a mobile IP phone system applied with a third embodiment of the present invention.

FIG. 10 is a time chart for explaining an operation of the mobile IP phone system applied with a third embodiment of the present invention. In FIG. 10, those steps which are the same as those corresponding steps in FIG. 7 are designated by the same reference numerals, and a description thereof will be omitted.

In this embodiment, it is assumed for the sake of convenience that the mobile terminal 1 calls the mobile terminal 2 as in the case of the first embodiment, but the mobile terminal 2 moves from its home location having the IP address "10.1.2.20" to an external location having an IP address "10.1.3.40" after the wireless router 12 returns a response with respect to the location inquiry to the proxy server Z. In this case, the mobile terminal 2 makes a location registration cancellation with respect to the wireless router 12 that is provided at its home location in a step ST32, so as to delete the location information related to the mobile terminal 2 from the database of the corresponding location server 22. For example, the step ST32 may make the location registration cancellation by judging that the mobile terminal 2 has moved from its home position when a radio wave intensity received by the mobile terminal 2 from the wireless router 12 at its home location becomes less than or equal to a predetermined value. When the mobile terminal 2 moves to the external location having the IP address "10.1.3.40" in a step ST33, the mobile terminal 2 makes a location registration with respect to the wireless router 13 that is provided at this external location in a step ST34, so as to make a location registration to the database of the corresponding location server 23. For example, the step ST34 judges that the mobile terminal 2 has moved from its home location to the external location where the wireless router 13 is provided, when the radio wave intensity received by the mobile terminal 2 from the wireless router 13 at the external location becomes greater than a predetermined value and is also greater than the radio wave intensity received from the wireless router 12 provided at its home position. Hence, the location information related to the mobile terminal 2 is registered in the location server 23. The wireless router 13 assigns the IP address "10.1.3.40" of this external location to the mobile terminal 2 in a step ST35.

On the other hand, if the mobile terminal 1 makes a call to the IP address "10.1.2.20" of the mobile terminal 2, that is, to the location of the mobile terminal 2 before the mobile terminal 2 moved, in the step ST6, but cannot obtain a response from the mobile terminal 2 within a predetermined time, the mobile terminal 1 makes a call with respect to the telephone number "050-222-2222" of the mobile terminal 2 to the proxy server Z in a step ST41, so as to execute a kind of a retry. The proxy server Z makes a location inquiry related to the mobile terminal 2 to the wireless router 12 in a step ST42, based on the connection router table 10A. In addition, the proxy server Z makes a location inquiry related to the mobile terminal 2 to other wireless routers (in this case, the wireless router 13) in a step ST43, based on the connection router table 10A. Since the mobile terminal 2 has moved to the external location in this case, the wireless router 13 that is provided at this external location returns a response with respect to the location inquiry to the proxy server Z in a step ST44, based on the location information related to the mobile terminal 2 managed within the database of the corresponding location server 23. The proxy server Z makes an address notification related to the IP address "10.1.3.40" of the mobile terminal 2 to the mobile terminal 1 in a step ST45 based on the response (location information) received from the wireless router 13. The mobile terminal 1 calls the IP address "10.1.3.40" of the mobile terminal 2 received by the address notification, in a step ST46. When an off-hook occurs at the mobile terminal 2 in response to a ringing, a response is returned to the mobile terminal 1 in a step ST47, and the mobile terminal 1 makes a busy registration to register the telephone number "050-111-

1111" of the mobile terminal 1 in the busy table 10B of the proxy server Z in a step ST48. In addition, the mobile terminal 2 makes a busy registration to register the telephone number "050-222-2222" of the mobile terminal 2 in the busy table 10B of the proxy server Z in a step ST49. Accordingly, a communication between the mobile terminal 1 and the mobile terminal 2 becomes possible a step ST50 as indicated by a broken line in FIG. 10.

Therefore, in this embodiment, it is possible to continue the communication even if the mobile terminal on the receiving end moves from its home location to an external location after the mobile terminal on the calling end calls the mobile terminal on the receiving end and the wireless router provided at the home location of the mobile terminal on the receiving end returns a response with respect to the location inquiry to the proxy server.

Further, the present invention is not limited to these embodiments, but various variations and modifications may be made without departing from the scope of the present invention.

What is claimed is:

1. A communication apparatus for making a wireless communication with a communication control unit that is coupled to a network, comprising:
 a part configured to make a call with respect to another communication apparatus on a called end;
 a part configured to receive an address of the other communication apparatus on the called end from a communication control unit that is located at a location of the other communication apparatus on the called end, said communication control unit registering the location of the other communication apparatus and assigning the address of the other communication apparatus;
 a part configured to make a call to the address received from the communication control unit;
 a part configured to make a busy registration with respect to a server that is coupled to the network so as to register a telephone number of said communication apparatus in said server; and
 a part configured to make a location registration cancellation with respect to a first communication control unit that is provided at a home location of said communication apparatus and to make a location registration with respect to a second communication control unit that is provided at an external location which is external to the home location of said communication apparatus, when said communication apparatus moves from its home location to the external location which is external to its home location during communication with said other communication apparatus,
 wherein an address of each communication apparatus changes when each communication apparatus moves from its home location to an external location which is external to its home location.

2. The communication apparatus as claimed in claim 1, further comprising:
 a part configured to notify an address assigned to said communication apparatus from the second communication control unit to said other communication apparatus.

3. A communication apparatus for making a wireless communication with a communication control unit that is coupled to a network, comprising:
 a part configured to make a location registration cancellation with respect to a first communication control unit that is provided at a home location of said communication apparatus and to make a location registration with respect to a second communication control unit that is provided at an external location which is external to the home location of said communication apparatus, when said communication apparatus moves from its home location to the external location which is external to its home location during communication with another communication apparatus; and
 a part configured to notify an address assigned to said communication apparatus from the second communication control unit to said other communication apparatus,
 wherein an address of each communication apparatus changes when each communication apparatus moves from its home location to an external location.

4. A communication control unit coupled via a network to a second communication control unit that is capable of making a wireless communication with a communication apparatus, comprising:
 a part, responsive to a call from a calling end to a called end, configured to inquire an address of a communication apparatus at the called end with respect to the second communication control unit;
 a part configured to notify the address of the communication apparatus on the called end, assigned by and received from the second communication control unit, to a communication apparatus on the calling end;
 a part configured to delete location information of a first communication apparatus from the database based on a location registration cancellation from the first communication apparatus which moved from said location to another location; and
 a part configured to register location information of a second communication apparatus in the database based on a location registration from the second communication apparatus which moved from said other location to said location,
 wherein an address of each communication apparatus changes when each communication apparatus moves from its home location to an external location.

5. The communication control unit as claimed in claim 4, further comprising:
 a first table configured to register and manage the address of the second communication control unit; and
 a second table configured to register and manage a telephone number related to a busy communication apparatus.

6. A communication control unit provided at a location and capable of making a wireless communication with a communication apparatus, comprising:
 a database configured to register and manage location information related to a communication apparatus located at said location and including an address of said communication apparatus assigned by the communication control unit;
 a part, responsive to a location inquiry related to a communication apparatus on a called end, configured to notify location information related to the communication apparatus on the called end if the location information related to the communication apparatus on the called end is registered in the database;
 a part configured to delete location information of a first communication apparatus from the database based on a location registration cancellation from the first communication apparatus which moved from said location to another location; and
 a part configured to register location information of a second communication apparatus in the database based on a location registration from the second communication apparatus which moved from said other location to said location, wherein an address of each communication apparatus changes when each communication apparatus moves from its home location to an external location.

7. A communication method for making a wireless communication between a communication apparatus and a first communication control unit that is coupled to a second communication control unit via a network, comprising:

managing location information of a communication apparatus that is located at each location in the first communication control unit provided at each location;

inquiring from the second communication control unit with respect to the first communication control unit an address of a communication apparatus on a called end in response to a call to the called end; and notifying from the second communication control unit to a communication apparatus on a calling end the address of the communication apparatus on the called end assigned by and notified from the first communication control unit; and making a location registration cancellation from the communication apparatus on the calling end with respect to the first communication control unit that is located at a home location of the communication apparatus on the calling end, and making a location registration from the communication apparatus on the calling end with respect to the first communication control unit that is provided at an external location which is external to the home location of the communication apparatus on the calling end, when the communication apparatus on the calling end moves from its home location to the external location which is external to its home location during communication with the communication apparatus on the called end, wherein an address of each communication apparatus changes when each communication apparatus moves from its home location to an external location.

8. The communication method as claimed in claim 7, comprising:

registering both the communication apparatuses on the calling end and the called end that are busy, from the second communication control unit to the first communication control unit, when a response is received from the communication apparatus on the called end in response to a call from the communication apparatus on the calling end to the communication apparatus on the called end.

9. The communication method as claimed in claim 7, comprising:

notifying an address assigned to the communication apparatus on the calling end from the first communication control unit to the communication apparatus on the called end.

10. The communication method as claimed in claim 7, wherein each first communication control unit comprises a wireless router configured to make a wireless communication with the communication apparatus, and a location server having a database configured to register and manage location information of each communication located within a location in which each first communication control unit is provided.

11. The communication method as claimed in claim 7, wherein the second communication control unit comprises a first table configured to register and manage an address of the first communication control unit, and a second table configured to register and manage a telephone number related to a busy communication apparatus.

12. The communication method as claimed in claim 7, wherein the communication between the communication apparatus on the calling end and the communication apparatus on the called end is made via first communication control units that are provided at present locations of the communication apparatuses on the calling and called ends, without going through first communication control units that are provided at locations of said communication apparatuses before moving.

13. A communication method for making a wireless communication between a communication apparatus and a first communication control unit that is coupled to a second communication control unit via a network, comprising:

managing location information of a communication apparatus that is located at each location in the first communication control unit provided at each location;

inquiring from the second communication control unit with respect to the first communication control unit an address of a communication apparatus on a called end in response to a call to the called end;

notifying from the second communication control unit to a communication apparatus on a calling end the address of the communication apparatus on the called end assigned by and notified from the first communication control unit;

making a location registration cancellation from the communication apparatus on the called end with respect to the first communication control unit that is located at a home location of the communication apparatus on the called end, and making a location registration from the communication apparatus on the called end with respect to the first communication control unit that is provided at an external location which is external to the home location of the communication apparatus on the called end, when the communication apparatus on the called end moves from its home location to the external location which is external to its home position during communication with the communication apparatus on the calling end; and notifying an address assigned to the communication apparatus on the called end from the first communication control unit to the communication apparatus on the calling end;

wherein an address of each communication apparatus changes when each communication apparatus moves from its home location to an external location.

14. A computer-readable storage medium which stores a program for causing a computer to function as a first communication apparatus that makes a wireless communication with a communication control unit coupled to a network, said program comprising:

a procedure causing the computer to make a call with respect to the second communication apparatus on a called end;

a procedure causing the computer to receive an address of the second communication apparatus from a communication control unit that is provided at a location where the second communication apparatus is located, said communication control unit registering the location of the second communication apparatus and assigning the address of the second communication apparatus;

a procedure causing the computer to call the address received from the communication control unit;

a procedure causing the computer to make a busy registration of a telephone number of said first communication apparatus with respect to a server that is coupled to the network; and a procedure causing the computer to make a location registration cancellation with respect to a first communication control unit that is provided at a home location of said first communication apparatus and to make a location registration with respect to a second communication control unit that is provided at an external location which is external to the home location of said first communication apparatus, when said first communication apparatus moves from its home location to the external location which is external to its home location during communication with a second communication apparatus, wherein an address of each communication apparatus changes when each communication apparatus moves from its home location to an external location.

15. A computer-readable storage medium which stores a program for causing a computer to function as a first communication apparatus that makes a wireless communication with a communication control unit coupled to a network, said program comprising:

a procedure causing the computer to make a location registration cancellation with respect to a first communication control unit that is provided at a home location of said first communication apparatus and to make a location registration with respect to a second communication control unit that is provided at an external location which is external to the home location of said first communication apparatus, when said first communication apparatus moves from its home location to the external location which is external to its home location during communication with a second communication apparatus; and a procedure causing the computer to notify an address assigned to said first communication apparatus from the second communication control unit to said second communication apparatus, wherein an address of each communication apparatus changes when each communication apparatus moves from its home location to an external location.

16. A computer-readable storage medium which stores a program for causing a computer to function as a first communication control unit coupled via a network to a second communication control unit that is capable of making a wireless communication with a communication apparatus, said program comprising:

a procedure causing the computer to inquire an address of a communication apparatus on a called end with respect to the second communication control unit in response to a call from a calling end to the called end;

a procedure causing the computer to notify the address of the communication apparatus on the called end assigned by and notified from the second communication control unit to a communication apparatus on the calling end; and a procedure causing the computer to make a location registration cancellation with respect to a first communication control unit that is provided at a home location of said first communication apparatus and to make a location registration with respect to a second communication control unit that is provided at an external location which is external to the home location of said first communication apparatus, when said first communication apparatus moves from its home location to the external location which is external to its home location during communication with a second communication apparatus, wherein an address of each communication apparatus changes when each communication apparatus moves from its home location to an external location.

17. A computer-readable storage medium which stores a program for causing a computer to function as a communication control unit that is provided at a location and is capable of making a wireless communication with a communication apparatus, said program comprising:

a procedure causing the computer to register and manage location information, related to a communication apparatus that is located at said location and including an address of said communication apparatus assigned by the communication control unit, in a database;

a procedure causing the computer to notify location information of a communication apparatus on a calling end to a source of a location inquiry that is related to the communication apparatus on the calling end in response to the location inquiry if the location information of the communication apparatus on the calling end is registered in the database; and a procedure causing the computer to make a location registration cancellation with respect to a first communication control unit that is provided at a home location of said first communication apparatus and to make a location registration with respect to a second communication control unit that is provided at an external location which is external to the home location of said first communication apparatus, when said first communication apparatus moves from its home location to the external location which is external to its home location during communication with a second communication apparatus, wherein an address of each communication apparatus changes when each communication apparatus moves from its home location to an external location.

* * * * *

UNITED STATES PATENT AND TRADEMARK OFFICE
CERTIFICATE OF CORRECTION

PATENT NO. : 7,924,769 B2
APPLICATION NO. : 10/981483
DATED : April 12, 2011
INVENTOR(S) : Masakazu Kojima Page 1 of 1

It is certified that error appears in the above-identified patent and that said Letters Patent is hereby corrected as shown below:

Column 15, Line 18, in claim 7, delete "end; and" and insert -- end; --, therefor.

Signed and Sealed this
Thirty-first Day of January, 2012

David J. Kappos
*Director of the United States Patent and Trademark Office*